US012786795B2

(12) United States Patent
Hwang et al.

(10) Patent No.: US 12,786,795 B2
(45) Date of Patent: Nov. 3, 2026

(54) METHOD AND APPARATUS FOR OPTIMIZING COMMUNICATION OF MOBILE BASE STATION

(71) Applicant: Pusan National University Industry-University Cooperation Foundation, Busan (KR)

(72) Inventors: Won Joo Hwang, Yangsan-si (KR); Seon Guen Jeong, Yangsan-si (KR)

(73) Assignee: Pusan National University Industry-University Cooperation Foundation, Busan (KR)

( * ) Notice: Subject to any disclaimer, the term of this patent is extended or adjusted under 35 U.S.C. 154(b) by 350 days.

(21) Appl. No.: 18/520,820

(22) Filed: Nov. 28, 2023

(65) Prior Publication Data

US 2025/0088910 A1 Mar. 13, 2025

(30) Foreign Application Priority Data

Sep. 7, 2023 (KR) ........................ 10-2023-0118705

(51) Int. Cl.

| | |
|---|---|
| ***H04W 28/08*** | (2023.01) |
| ***H04W 72/044*** | (2023.01) |
| *G06N 10/80* | (2022.01) |

(52) U.S. Cl.

CPC ... *H04W 28/0983* (2020.05); *H04W 72/0473* (2013.01); *G06N 10/80* (2022.01)

(58) Field of Classification Search

CPC ......... H04W 28/0983; H04W 72/0473; H04W 24/02; H04W 16/18; G06N 10/80; G06N 10/20; Y02D 30/70; H04B 17/373; H04B 17/391

See application file for complete search history.

(56) References Cited

U.S. PATENT DOCUMENTS 11,703,853 B2 7/2023 Hong et al.
2020/0351666 A1* 11/2020 Mohen Venkatakrishnan ............. H04W 16/02
2024/0224063 A1* 7/2024 Saravanan ............ H04L 5/0058

FOREIGN PATENT DOCUMENTS

| | | | | |
|---|---|---|---|---|
| AU | 2017420803 B2 | | 1/2019 | |
| CN | 106792716 A | * | 5/2017 | ............ H04W 24/02 |
| KR | 10-2149617 B1 | | 8/2020 | |
| KR | 10-2394237 B9 | | 4/2022 | |
| WO | WO-2015133890 A1 | * | 9/2015 | .......... H04W 52/243 |

* cited by examiner

*Primary Examiner* — Sujoy K Kundu
*Assistant Examiner* — Samuel Dilan Rutnam
(74) *Attorney, Agent, or Firm* — NSIP Law

(57) ABSTRACT

A method and an apparatus for optimizing communication of mobile base stations are provided. The method responds to an optimization problem of maximizing a sum rate of transmission and generates a QUBO model capable of quantum computing to rapidly enable optimal resource allocation through quantum annealing.

10 Claims, 12 Drawing Sheets

FIG. 3

Algorithm 1: The QA-Based Clustering Algorithm with CQM in *D-Wave*

Input : Locations of GUs and UAVs.
Output: The user association vector

Build the CQM object
Define the binary variable $X_{m,n}$
for $m \in \mathcal{M}$ do
  for $n \in \mathcal{N}$ do
    $H_{cost} \leftarrow X_{m,n} d_{m,n}$
  end
end
$H_{QUBO} \leftarrow H_{cost} + \lambda_p H_{C7}$
Run the CQM sampler
Return the optimal spin combination $X^*_{m,n}$

FIG. 4

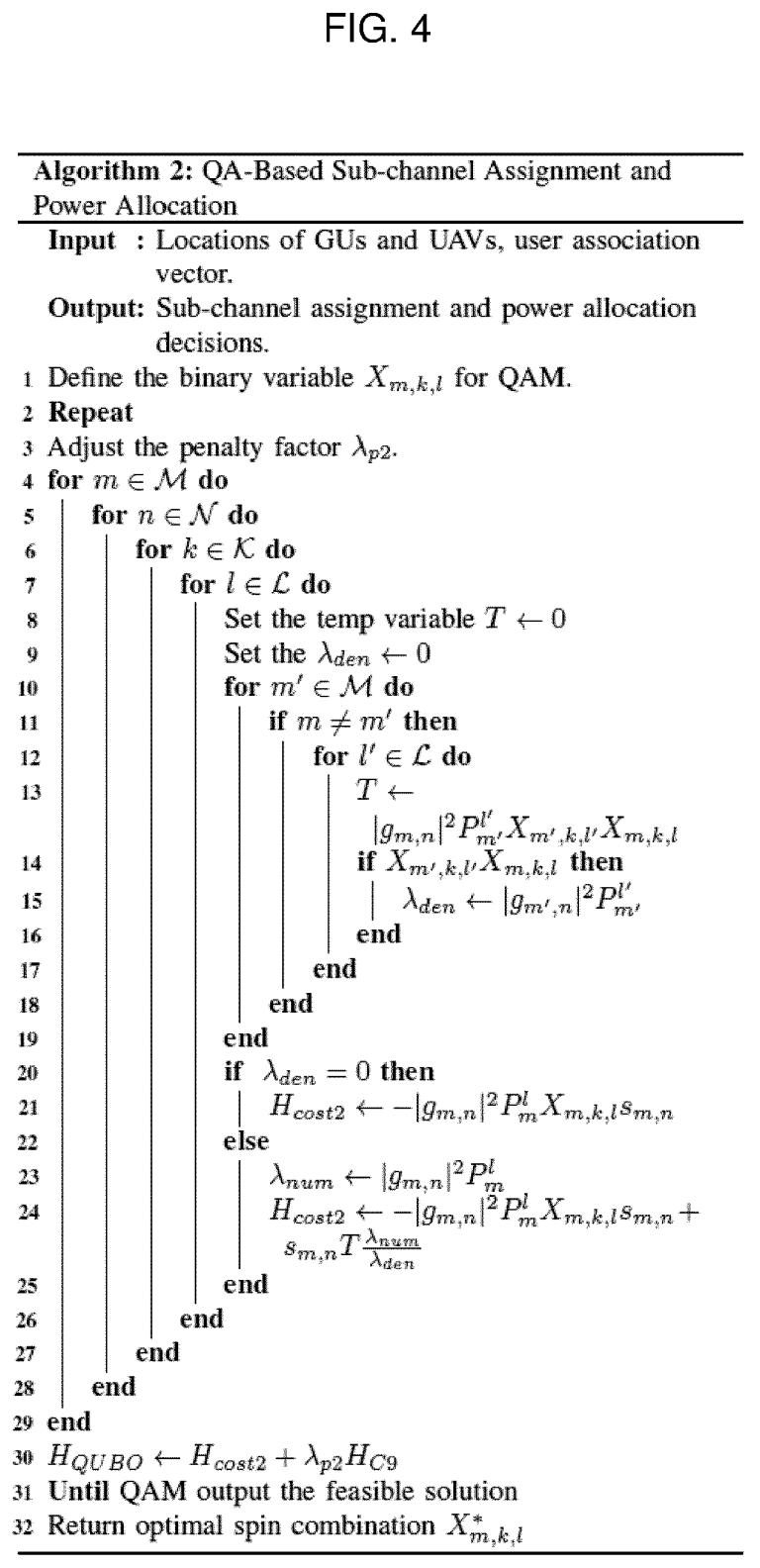

Algorithm 2: QA-Based Sub-channel Assignment and Power Allocation

Input : Locations of GUs and UAVs, user association vector.

Output: Sub-channel assignment and power allocation decisions.

Define the binary variable $X_{m,k,l}$ for QAM.
Repeat
Adjust the penalty factor $\lambda_{p2}$.
for $m \in \mathcal{M}$ do
  for $n \in \mathcal{N}$ do
    for $k \in \mathcal{K}$ do
      for $l \in \mathcal{L}$ do
        Set the temp variable $T \leftarrow 0$
        Set the $\lambda_{den} \leftarrow 0$
        for $m' \in \mathcal{M}$ do
          if $m \neq m'$ then
            for $l' \in \mathcal{L}$ do
              $T \leftarrow |g_{m,n}|^2 P_{m'}^{l'} X_{m',k,l'} X_{m,k,l}$
              if $X_{m',k,l'} X_{m,k,l}$ then
                $\lambda_{den} \leftarrow |g_{m',n}|^2 P_{m'}^{l'}$
              end
            end
          end
        end
        if $\lambda_{den} = 0$ then
          $H_{cost2} \leftarrow -|g_{m,n}|^2 P_m^l X_{m,k,l} s_{m,n}$
        else
          $\lambda_{num} \leftarrow |g_{m,n}|^2 P_m^l$
          $H_{cost2} \leftarrow -|g_{m,n}|^2 P_m^l X_{m,k,l} s_{m,n} + s_{m,n} T \frac{\lambda_{num}}{\lambda_{den}}$
        end
      end
    end
  end
end
$H_{QUBO} \leftarrow H_{cost2} + \lambda_{p2} H_{C9}$
Until QAM output the feasible solution
Return optimal spin combination $X_{m,k,l}^*$

METHOD AND APPARATUS FOR OPTIMIZING COMMUNICATION OF MOBILE BASE STATION

CROSS REFERENCE TO RELATED APPLICATION(S)

The present application claims the benefit under 35 U.S.C. § 119 of Korean Patent Application No. 10-2023-0118705, filed on Sep. 7, 2023, the entire disclosure of which is incorporated by reference for all purposes.

BACKGROUND

1. Field

The present disclosure relates to a technology for optimizing communication of mobile base stations and, more particularly, to a technology for allocating optimal resources to mobile base stations to maximize the sum rate of transmission of a network system using the plurality of mobile base stations.

2. Description of Related Art

A mobile base station may be used to support communication in a disaster situation where a ground base station is damaged or a situation where large crowds of people gather, or may be used to connect users located in communication dead zones to a ground base station and to expand communication coverage.

As users' data usage increases, it is required for mobile base stations to share licensed spectrum bands to ensure high quality communication performance. However, there is a problem that interference occurs when the mobile base stations share the licensed spectrum bands. In particular, aerial base stations using multiple unmanned aerial vehicles (UAVs) may increase interference because processing of co-channel interference is complicated.

In addition, when spectrum resources and resources for mobile base stations having limited transmission power are not properly allocated, problems may occur such as lower throughput and high traffic load at times when the number of users in a service area increases. That is, since the service area affects channel gain between the mobile base stations and ground users (GUs), it is required to allocate the resources efficiently for communication performance.

In this regard, an objective function has been derived and used to find an optimal channel and power level to be allocated to each mobile base station after assigning the ground users to the mobile base stations through clustering. The conventional technology is cumbersome because users have to repeat a process of checking results and adjusting parameters included in the objective function.

In addition, in a case of including a plurality of mobile base stations, many variables have to be considered in the conventional technology, so there is a problem that calculations are complex and time-consuming. In an aerial base station system, it is important to make efficient allocation in real time due to limited battery lifetime of UAVs and a dynamic environment, but achieving rapid optimization with the conventional technology is difficult, so there are limitations in performing communication optimization of aerial base stations.

Recently, quantum annealing has been proposed as a way to quickly solve an optimization problem. However, little research has been done on achieving the optimal allocation of mobile base stations by applying the quantum annealing. In addition, the objective function conventionally derived and used for the optimal allocation of the mobile base stations is in a form that is unable to be input into a quantum computer, whereby there is a problem in that the quantum annealing may be inapplicable.

Related Art may include Korean Patent Application Nos. 10-2019-0167924 and 10-2020-0106062.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An objective of the present disclosure is to solve the above-described problems and provide a technology for optimizing communication of mobile base stations by way of generating a Quadratic Unconstrained Binary Optimization (QUBO) model capable of quantum computing from an objective function used to determine subchannels and power levels that maximize throughput of the mobile base stations and enabling rapid derivation of the subchannels and power levels to be allocated to the mobile base stations through quantum annealing.

The objective of the present disclosure is not limited to the objective mentioned above, and other objectives not mentioned herein will be clearly understood from the following description.

In a general aspect of the disclosure, a method for optimizing communication of mobile base stations, the method being performed by an electronic apparatus including a memory and a processor, is disclosed. The method includes: calculating a first parameter value from a product of squared probabilistic path loss between a first mobile base station and a ground user and transmission power when a first level which is any one of a plurality of power levels is allocated to the first mobile base station, assuming that a first channel which is any one of a plurality of channels is assigned to the first mobile base station which is any one of the plurality of mobile base stations and a second mobile base station which is another mobile base station; generating a Quadratic Unconstrained Binary Optimization (QUBO) model including a first model parameter calculated from a product of squared probabilistic path loss between the second mobile base station and the ground user, transmission power when a second level which is any one of the plurality of power levels is allocated to the second mobile base station, and a first association variable having any one of a first value and second value preset depending on whether the second mobile base station is associated with the first channel and the second level when the first parameter value matches a preset reference value depending on whether the first parameter value matches the preset reference value or not; inputting the QUBO model including the first model parameter into a quantum computer; and obtaining a plurality of result values indicating whether each combination of the mobile base stations, channels, and power levels, which is output as a result of annealing the QUBO model including the first model parameter to a ground state in the quantum computer, is optimal or not.

The method may further include: clustering, before calculating the first parameter value, the ground user with respect to any one mobile base station according to each distance between the ground user and the plurality of mobile base stations, wherein, when the first parameter value matches the preset reference value, the generating of the QUBO model including the first model parameter further comprises: the first model parameter calculated from the product of the squared probabilistic path loss between the second mobile base station and the ground user; the transmission power when the second level which is any one of the plurality of power levels is allocated to the second mobile base station, the first association variable having any one of the first value and second value preset depending on whether the second mobile base station is associated with the first channel and the second level; and a second association variable having any one of the first value and second value preset depending on whether the ground user is clustered with respect to the second mobile base station in the clustering step.

The method may further include: clustering, before calculating the first parameter value, the ground user with respect to any one mobile base station according to each distance between the ground user and the plurality of mobile base stations, wherein, when the first parameter value does not match the preset reference value, the generating of the QUBO model including the first model parameter further comprises: calculating a second parameter value from a product of the squared probabilistic path loss between the second mobile base station and the ground user and the transmission power when the second level which is any one of the plurality of power levels is allocated to the second mobile base station and generates the QUBO model including the first model parameter calculated from the product of the squared probabilistic path loss between the second mobile base station and the ground user, the transmission power when the second level which is any one of the plurality of power levels is allocated to the second mobile base station, the first association variable having any one of the first value and second value preset depending on whether the second mobile base station is associated with the first channel and the second level, and the second association variable having any one of the first value and second value preset depending on whether the ground user is clustered with respect to the second mobile base station in the clustering step; and calculating a second model parameter by dividing the second parameter value by the first parameter value.

The clustering step may include: generating the QUBO model including a model parameter calculated by a product of distances calculated by differences between a location coordinate of the ground user and location coordinates of the mobile base stations and an association variable having a first value or second value preset depending on whether the ground user and the mobile base stations are associated with each other; inputting the QUBO model including the model parameter to the quantum computer; obtaining the plurality of result values indicating whether each combination of the mobile base stations and the ground user, which is output as a result of annealing the QUBO model including the model parameter to a ground state in the quantum computer, is optimal or not; and classifying the ground user with respect to any one mobile base station, among the plurality of mobile base stations, having a result value obtained from a combination with the ground user is a value corresponding to an optimum value.

The method may further include selecting at least one of the combinations of the mobile base stations, the channels, and the power levels, output as the result of annealing the QUBO model, indicated as being optimal; and configuring the mobile base stations, the channels, and the power levels in the selected combination to enable communication between the mobile base stations and the ground user based on the selection.

In another general aspect of the disclosure, an apparatus for optimizing communication of mobile base stations includes: a memory for storing at least one or more instructions; a communicator for performing communication with a quantum computer; and a processor connected to the memory and the communicator, the processor configured to perform the at least one or more instructions, so as to generate a Quadratic Unconstrained Binary Optimization (QUBO) model to be input into the quantum computer, wherein, as performing the at least one or more instructions, the processor is further configured to: calculate a first parameter value from a product of squared probabilistic path loss between a first mobile base station and a ground user and transmission power when a first level which is any one of a plurality of power levels is allocated to the first mobile base station in an assumption that a first channel which is any one of a plurality of channels is assigned to the first mobile base station which is any one of the plurality of mobile base stations and a second mobile base station which is another mobile base station; generate the QUBO model including a first model parameter calculated from a product of squared probabilistic path loss between the second mobile base station and the ground user, transmission power when a second level which is any one of the plurality of power levels is allocated to the second mobile base station, and a first association variable having any one of a first value and second value preset depending on whether the second mobile base station is associated with the first channel and the second level when the first parameter value matches a preset reference value depending on whether the first parameter value matches the preset reference value or not; input the QUBO model including the first model parameter into the quantum computer through the communication unit; and obtain a plurality of result values indicating whether each combination of the mobile base stations, channels, and power levels, which is output as a result of annealing the QUBO model including the first model parameter to a ground state in the quantum computer, is optimal or not.

The processor may be further configured to: before calculating the first parameter value, cluster the ground user with respect to any one mobile base station according to each distance between the ground user and the plurality of mobile base stations; and when the first parameter value matches the preset reference value after calculating the first parameter value, generate the QUBO model including: the first model parameter calculated from the product of the squared probabilistic path loss between the second mobile base station and the ground user, the transmission power when the second level which is any one of the plurality of power levels is allocated to the second mobile base station; the first association variable having any one of the first value and second value preset depending on whether the second mobile base station is associated with the first channel and the second level; and a second association variable having any one of the first value and second value preset depending on whether the ground user is clustered with respect to the second mobile base station in the clustering.

The processor may be further configured to: before calculating the first parameter value, cluster the ground user with respect to any one mobile base station according to each distance between the ground user and the plurality of mobile base stations; and when the first parameter value does not match the preset reference value after calculating the first parameter value, calculate a second parameter value from the product of the squared probabilistic path loss between the second mobile base station and the ground user and the transmission power when the second level which is any one of the plurality of power levels is allocated to the second mobile base station and generate the QUBO model including the first model parameter calculated from the product of the squared probabilistic path loss between the second mobile base station and the ground user, the transmission power when the second level which is any one of the plurality of power levels is allocated to the second mobile base station, the first association variable having any one of the first value and second value preset depending on whether the second mobile base station is associated with the first channel and the second level, and the second association variable having any one of the first value and second value preset depending on whether the ground user is clustered with respect to the second mobile base station in the clustering; and calculate a second model parameter by dividing the second parameter value by the first parameter value.

The processor may be further configured to: based on the clustering, generate the QUBO model including a model parameter calculated by a product of distances calculated by differences between a location coordinate of the ground user and location coordinates of the mobile base stations and an association variable having a first value or second value preset depending on whether the ground user and the mobile base stations are associated with each other; input the QUBO model including the model parameter to the quantum computer; obtain a plurality of result values indicating whether each combination of the mobile base stations and the ground user, which is output as a result of annealing the QUBO model including the model parameter to a ground state in the quantum computer, is optimal or not; and classify the ground user with respect to any one mobile base station, among the plurality of mobile base stations, having a result value obtained from a combination with the ground user being a value corresponding to an optimum value.

The processor may be further configured to: select at least one of the combinations of the mobile base stations, the channels, and the power levels, output as the result of annealing the QUBO model, indicated as being optimal; and facilitate communication between the mobile base stations and the ground user based on the selection.

The effects of the present disclosure are not limited to the above-mentioned effects, and other effects not mentioned herein will be clearly understood by those skilled in the art from the description of the claims.

BRIEF DESCRIPTION OF THE DRAWINGS

FIG. 3 is a view illustrating a QUBO model generation algorithm for determining subchannels and power levels in the exemplary embodiments of the present disclosure.

FIG. 4 is a view illustrating the QUBO model generation algorithm for clustering in the exemplary embodiments of the present disclosure.

DETAILED DESCRIPTION

Advantages and features of the present disclosure, and a method of achieving them will become apparent with reference to the exemplary embodiments described below in detail together with the accompanying drawings. However, the present disclosure is not limited to the exemplary embodiments disclosed below, but will be implemented in various different forms. Rather, the present exemplary embodiments are provided so that the embodiment of the present disclosure will be thorough and complete, and will fully convey the concept of the present disclosure to those skilled in the art, and the present disclosure will only be defined by the descriptions of the appended claims. Meanwhile, the terminology used herein is for the purpose of describing the exemplary embodiments only and is not intended to be limiting of the present disclosure. In the present specification, the singular form also includes the plural form unless otherwise specified. The present disclosure relates to a technology for determining ground users with whom mobile base stations will communicate, channels, and power levels in order to optimize communication of the mobile base stations.

The present disclosure differs from existing technologies in that quantum annealing is used to cluster ground users with whom mobile base stations will communicate, and then channels and transmission power that are allocated to the mobile base stations are determined.

In particular, the present disclosure has technical features that an objective function, used to allocate subchannels and power levels that maximize a sum rate of transmission of a communication network including mobile base stations, is converted into a linear QUBO model capable of quantum computing.

Such technical features are achieved by a configuration in which the objective function for determining subchannels and power levels that maximize throughput is converted to another form on the basis of a mixed-integer linear fractional programming (MILFP) technique, parameters to be substituted into a QUBO model is defined, and mathematical equations are classified and calculated so as to input the defined parameters in a form calculable on a quantum computer.

Figure 1:
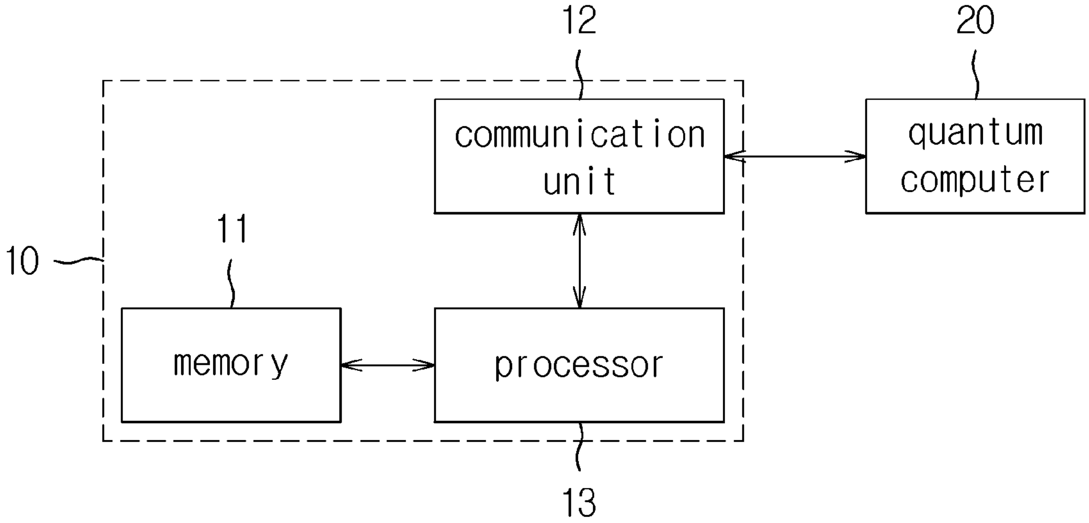
FIG. 1 is a block diagram illustrating an apparatus for optimizing communication of mobile base stations according to an exemplary embodiment of the present disclosure.

Referring to FIG. 1, an apparatus 10 for optimizing communication of mobile base stations according to the exemplary embodiment of the present disclosure may include a memory 11, a communication unit 12, and a processor 13.

The memory 11 may store at least one or more instructions.

Figure 2:
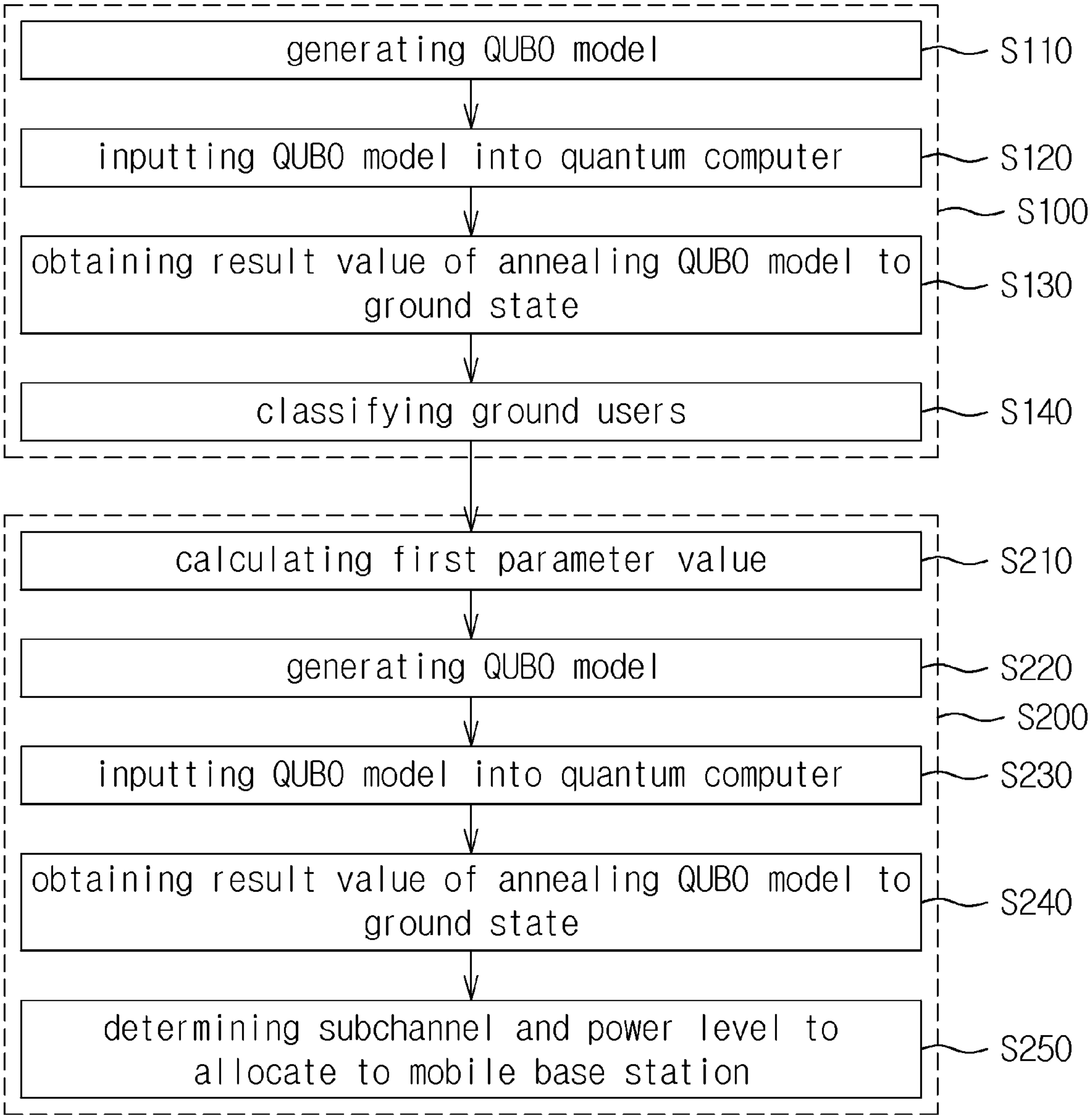
FIG. 2 is a flowchart illustrating a method for optimizing communication of mobile base stations according to another exemplary embodiment of the present disclosure.

Each step of the method for optimizing the communication of mobile base stations according to another exemplary embodiment of the present disclosure shown in FIG. 2 may be implemented as computer instructions for performing designated functions while loaded on a processor or memory of an electronic apparatus (e.g., a general-purpose computer, a special-purpose computer, a portable laptop computer, and a network computer) capable of data processing.

The memory 11 may store the at least one or more instructions for performing steps (or operations) of the method for optimizing the communication of mobile base stations according to another exemplary embodiment of the present disclosure.

Since computer program instructions may be stored in the computer-readable memory, functions described in the blocks of a block diagram(s) or the steps of a flowchart may also be produced as a product including an instruction means for performing the functions.

Hereinafter, for convenience of description, reference numerals are matched for functionally identical content and redundant description will be omitted.

The communication unit 12 (e.g., a communicator) may be a component capable of communicating with a quantum computer 20 by wired or wireless connection. That is, the communication unit 12 may be any type of communication device (e.g., a wired transceiver or a wireless transceiver) configured to communicate or interconnect with the quantum computer 20. The communication unit 12 may exchange qubits or classical bits (which may be converted into qubits and vice versa, or the like).

The processor 13 may perform at least one or more instructions stored in the memory 11 while connected to the memory 11 and the communication unit 12, thereby generating a QUBO model to be input to the quantum computer 20.

In order to optimize communication in a communication network using a plurality of mobile base stations, each mobile base station that maximizes the sum of throughput depending on received signal power and interference should determine ground users, subchannels, and power levels, which will support communication, under constraints below.

Constraint 1) Each ground user is constrained to communicate with only one mobile base station.

Constraint 2) Each mobile base station is constrained to occupy only one subchannel.

Constraint 3) Each mobile base station is constrained to perform transmission at only one power level.

In step S100, a processor 13 may firstly cluster ground users with respect to mobile base stations in order to determine a user association with each mobile base station that satisfies constraint 1. In step S200, the processor 13 may determine each mobile base station's subchannel and power level satisfying constraint 1 and constraint 2 and maximizing the sum of throughput depending on received signal power and interference on the basis of the association of users connected to each mobile base station and derived by the clustering.

In step S100, the processor 13 may cluster each of a plurality of preset ground users to a cluster for any one of a plurality of preset mobile base stations.

In step S100, the processor 13 may cluster the ground users with respect to any one mobile base station according to respective distances between the ground users and the plurality of mobile base stations.

A QUBO model may be expressed as an optimization problem below.

$$\underset{x}{\text{minimize}}\ H_{QUBO}(x) = x^T Qx \qquad \text{[Equation 1]}$$

Here, x refers to a vector of binary decision variables, $x^T$ refers to a transpose matrix of x, and Q refers to an upper diagonal matrix.

A QUBO model may also be expressed as a binary combinatorial optimization problem having a linear term and a quadratic term. A two-dimensional QUBO model having N×N binary vectors may be expressed as an equation below.

$$H_{QUBO}(x) = \sum_{i=1}^{N} Q_{i,i}x_i + \sum_{i=0}^{N}\sum_{j=1}^{N} Q_{ij}x_i x_j \qquad \text{[Equation 2]}$$

Here, $x_i \in \{0,1\}$ is an i-th binary variable. $Q_{i,i} \in R$ are respectively linear and quadratic coefficients in $1 \leq j \leq i \leq N$.

In addition, by using an association variable $X_{m,n}$ indicating whether an n-th ground user and an m-th mobile base station are associated with each other or not and using a distance $d_{m,n}$ between the n-th ground user and the m-th mobile base station, a clustering problem of a communication network in which preset M mobile base stations support communication of preset N ground users may be expressed as the following equation.

$$\underset{X}{\text{minimize}} \sum_{m\in\mathcal{M}} \sum_{n\in\mathcal{N}} X_{m,n} d_{m,n} \qquad \text{[Equation 3]}$$

$$\text{s.t.} \sum_{m\in\mathcal{M}} X_{m,n} \leq 1, \forall\, n \in \mathcal{N}, \qquad \text{C7}$$

$$X_{m,n} \in \{0, 1\}, \forall\, m \in \mathcal{M}, n \in \mathcal{N}. \qquad \text{C8}$$

The distance $d_{m,n}$ between the n-th ground user and the m-th mobile base station may be calculated by applying a root to a value calculated by adding an absolute value of a squared difference between an xy coordinate of the ground user and an xy coordinate of the mobile base station to an absolute value of a squared height of the mobile base station.

C7 represents constraint 1, and since Equation 3 is defined as the combinatorial optimization problem, Equation 3 is converted to a QUBO model as shown in an equation below.

$$H_{QUBO} = H_{cost} + \lambda_p H_{C7} \qquad \text{[Equation 4]}$$

Here, $$H_{cost}=\sum_{m\in M}\sum_{n\in N}X_{m,n}d_{m,n},$$

$\lambda_p$ is a penalty factor for controlling influence of $H_{C7}$ and $H_{C7}$ is a penalty term for reflecting C7, which may be defined as in an equation below.

$$H_{C7}=\sum_{n\in N}\left(\sum_{m\in M}X_{m,n}-1\right)^2 \quad \text{[Equation 5]}$$

In step S110, the processor 13 may generate a QUBO model including a model parameter calculated by a product of a distance calculated by a difference between a location coordinate of a ground user and a location coordinate of the mobile base station and an association variable having a first value (e.g., 0) or second value (e.g., 1) preset depending on whether the ground user and the mobile base station are associated with each other or not. In step S120, the processor 13 may input the QUBO model including the model parameter to a quantum computer 20 through the communication unit 12.

Specifically, referring to FIGS. 2 and 3, in step S110, the processor 13 may define a binary association variable $X_{m,n}$ indicating whether the n-th ground user and the m-th mobile base station are associated with each other or not, calculate a model parameter $H_{cost}$ corresponding to an objective function for clustering by multiplying the association variable $X_{m,n}$ by the distance $d_{m,n}$ between the n-th ground user and the m-th mobile base station, and generate the QUBO model $H_{QUBO}$ including the model parameter $H_{cost}$.

Here, the distance $d_{m,n}$ between the n-th ground user and the m-th mobile base station may be calculated by applying a root to a value calculated by adding a value of a squared difference between the xy location coordinate of the n-th ground user and the xy location coordinate of the m-th mobile base station to a value of a squared height of the m-th mobile base station.

In addition, in step S120, the processor 13 may input the QUBO model $H_{QUBO}$ into a constrained quadratic model (CQM) of the quantum computer 20 through the communication unit 12, and may allow to output an optimal spin combination $X^*_{m,n}$ having a result value between 0 and 1 in order to indicate the association between the n-th ground user and the m-th mobile base station when the QUBO model $H_{QUBO}$ becomes a ground state through quantum annealing in the quantum computer 20.

In step S130, the processor 13 may obtain, through the communication unit 12, a plurality of result values indicating whether each combination of the mobile base stations and ground users is optimal or not, the result values being output as a result of annealing the QUBO model including the model parameter to the ground state in the quantum computer 20. In step S140, by using the plurality of obtained result values indicating whether each combination of the mobile base stations and ground users is optimal or not, the processor 13 may classify each ground user into any one mobile base station, among the plurality of mobile base stations, of which the result value obtained from each combination with the ground users is a value corresponding to an optimum.

Here, when a result value for the optimal spin combination $X^*_{m,n}$ between the n-th ground user and the m-th mobile base station is 1, this means that it is optimal for the n-th ground user to communicate through the m-th mobile base station.

In step S130, the processor 13 may obtain a plurality of result values corresponding to a plurality of optimal spin combinations according to the combinations of the plurality of n preset ground users and the plurality of m preset mobile base stations. In step S140, the processor 13 may classify and cluster the n-th ground user into a cluster for the m-th mobile base station when the result value for the optimal spin combination $X^*_{m,n}$ between the n-th ground user and the m-th mobile base station is the value corresponding to the optimum (e.g., 1).

Thereafter, in step S200, the processor 13 may perform optimization for subchannel assignment and power allocation for each mobile base station.

In step S200, the processor 13 may perform the optimization for determining a subchannel to be assigned to each mobile base station among the plurality of K preset subchannels and a power level to be allocated to each mobile base station among the plurality of L preset power levels on the basis of the clustering results that determined whether the ground users are associated with the mobile base stations or not in step S100.

In step S200, the processor 13 may determine a subchannel and power level of each mobile base station that satisfy constraint 2 (i.e., each mobile base station is constrained to occupy only one subchannel) and constraint 3 (i.e., each mobile base station is constrained to perform transmission at only one power level) and maximize the sum of throughput depending on received signal power S and interference I.

Here, when the m-th mobile base station supports communication of the n-th ground user with transmission power of an l-th power level through a k-th subchannel, the received signal power S that is received by the n-th ground user may be expressed in an equation below.

$$S=s_{m,n}\left|g_{m,n}\right|^2P_m^lX_{m,k,l} \quad \text{[Equation 6]}$$

Here, $S_{m,n}$ is a binary association variable indicating whether the m-th mobile base station and the n-th ground user are associated with each other or not, $g_{m,n}$ is probabilistic path loss between the m-th mobile base station and the n-th ground user, $$P_m^l$$

is transmission power when the l-th power level is allocated to the m-th mobile base station, and $X_{m,k,l}$ is a binary association variable indicating whether the m-th mobile base station, the k-th subchannel, and the l-th power level are associated with each other or not.

In addition, the interference 1 which is generated when the m-th mobile base station to which the k-th subchannel and l-th power level are allocated and the m'-th mobile base station to which the k'-th subchannel and I'-th power level are allocated simultaneously support communication for the n-th ground user may be expressed by an equation below.

$$1=\sum_{m'}\sum_{k'}\sum_{l'}s_{m,n}|g_{m',n}|^2P_{m'}^{l'}X_{m',k',l'}\delta_{k,k'}\left(1-\delta_{m,m'}\right) \quad \text{[Equation 7]}$$

Each of $\delta_{k,k'}$ and $\delta_{m,m'}$ refers to Kronecker delta, which is 1 when variables in each pair (m and m', k and k') are identical and 0 otherwise.

A data rate at a time when the m-th mobile base station to which the k-th subchannel and the l-th power level are allocated supports communication for the n-th ground user may be expressed as an equation below.

$$R_{m,n}^{k,l} = s_{m,n}\log\left(1+\gamma_{m,n}^{k,l}\right) \quad \text{[Equation 8]}$$

Here, $$\gamma_{m,n}^{k,l} = \frac{S}{I+|Z_0|}$$

is a signal-to-interference-plus-noise ratio (SINR), and $|Z_0|$ is noise power.

Since $s_{m,n}$ (i.e., the binary association variable indicating whether the n-th ground user is associated with the m-th mobile base station or not) is determined in the clustering step of S100, the optimization problem that ensures the sum of data rates to be maximized may be expressed as $$\log\left(1+\gamma_{m,n}^{k,l}\right).$$

When log(x+1)≈x is used to approximate $$\log\left(1+\gamma_{m,n}^{k,l}\right)$$

and the sum is minimized by adding a negative sign in accordance with quantum annealing for finding a ground state having minimum energy, an optimization problem as shown in an equation below may be derived.

$$\underset{X}{\text{minimize}} - \sum_{m\in\mathcal{M}}\sum_{n\in\mathcal{N}}\sum_{k\in\mathcal{K}}\sum_{l\in\mathcal{L}}\frac{S}{1+|Z_0|^2} \quad \text{[Equation 9]}$$

$$\text{s.t. } C9: \sum_{k\in\mathcal{K}}\sum_{l\in\mathcal{L}} X_{m,k,l} \le 1, \forall m\in\mathcal{M},$$

$$C10: X_{m,k,l}\in\{0,1\},$$

$$\forall m\in\mathcal{M}, k\in\mathcal{K}, l\in\mathcal{L}.$$

Since $|Z_0|^2$ as a constant may be ignored in the QUBO model, focus is on minimizing the sum of $$-\frac{S}{I}.$$

Quantum computing is unable to be applied for $$-\frac{S}{I}$$

in the form of a fraction, so Equation 9 above is to be converted to another form based on the ideas of the mixed-integer linear fractional programming (MILFP) method.

A general form in the MILFP is as shown in an equation below.

$$\text{minimize}\left\{Q(x) = \frac{N(x)}{D(x)}\middle|\, x\in\mathcal{F}\right\} \quad \text{[Equation 10]}$$

Here, in a case when a variable x may be continuous or discontinuous, F is a feasible set, and a denominator function D(x) is always a positive number, Equation 10 may be rearranged as follows according to the MILFP.

$$F(q) = \text{minimize}\{N(x) - q\cdot D(x) | x\in\mathcal{F}\} \quad \text{[Equation 11]}$$

Here, q is a variable parameter.

A parametric objective function F(q) has one zero point so as to be identical to a global optimal solution.

Accordingly, x* is an optimal solution, and in a case where F(q*)=F(q*,x*)=max{(N(x)−q*D(x)|x∈F}=0, a parametric element q* may be obtained as in an equation below.

$$q^* = \frac{N(x^*)}{D(x^*)} = \max\left\{\frac{N(x)}{D(x)} | x\in\mathcal{F}\right\} \quad \text{[Equation 12]}$$

Inspired by such an MILFP method, Equation 9 may be reorganized as an equation below.

$$\underset{X}{\text{minimize}} - \sum_{m\in\mathcal{M}}\sum_{n\in\mathcal{N}}\sum_{k\in\mathcal{K}}\sum_{l\in\mathcal{L}} S + \lambda_I \sum_{n\in\mathcal{N}} I \quad \text{[Equation 13]}$$

$$\text{s. t. } C9, C10.$$

As a result, the original problem of ensuring the sum of data rates to be maximized may be converted to a QUBO model as follows.

$$H_{QUBO} = H_{cost2} + \lambda_{p2}H_{C9} \quad \text{[Equation 14]}$$

Here, $$H_{cost2} = -\sum_{m\in\mathcal{M}}\sum_{n\in\mathcal{N}}\sum_{k\in\mathcal{K}}\sum_{l\in\mathcal{L}} S + \lambda_1 \sum_{n\in\mathcal{N}} I,$$

$\lambda_{p2}$ is a penalty coefficient for controlling influence of $H_{C9}$, and $H_{C9}$ is a penalty term for reflecting C9, which may be defined as in an equation below.

$$H_{C9} = \sum_{m\in\mathcal{M}}\left(\sum_{k\in\mathcal{K}}\sum_{l\in\mathcal{L}} X_{m,k,l} - 1\right)^2 \quad \text{[Equation 15]}$$

In addition, based on Equation 12 of the MILFP, an optimal scaling parameter $\lambda_I$ may be derived from Equation 13 as shown in an equation below.

$$\lambda_I = \frac{|g_{m',n}|^2 P_m^l X^*_{m,k,l}}{\sum_{m'}\sum_{k'}\sum_{l'} |g_{m',n}|^2 P_{m'}^{l'} \delta_{k,k'} (1-\delta_{m,m'}) X^*_{m',k',l'}} \quad \text{[Equation 16]}$$

Here, X* refers to an optimal solution of a QUBO model.

According to the above description, the embodiment of present disclosure may convert the optimization problem, which maximizes throughput, into a QUBO model form and calculate a parameter $\lambda_I$ included in the QUBO model in the optimal solution.

That is, the QUBO model may be defined by way of deriving an optimal scaling parameter without the hassle of arbitrarily inputting values, checking results, and adjusting values to define the parameter included in the QUBO model.

However, since the optimal scaling parameter derived in Equation 16 is in the form of a fraction, it is still difficult to directly apply the optimal scaling parameter to the quantum computer 20.

Accordingly, based on a configuration below, the processor 13 may generate a QUBO model in a form corresponding to the optimal scaling parameter $\lambda_I$ according to Equation 16 and calculable on the quantum computer 20.

Specifically, in step S210, the processor 13 may calculate a first parameter value from a product of squared probabilistic path loss between a first mobile base station and a ground user and transmission power when a first level which is any one of a plurality of power levels is allocated to the first mobile base station in an assumption that a first channel which is any one of a plurality of channels is assigned to the first mobile base station which is any one of a plurality of mobile base stations and a second mobile base station which is another mobile base station.

In addition, in step S220, depending on whether the first parameter value matches a preset reference value, when the first parameter value matches the preset reference value, the processor 13 may generate a QUBO model including a first model parameter calculated from a product of squared probabilistic path loss between the second mobile base station and the ground user, transmission power when a second level which is any one of the plurality of power levels is allocated to the second mobile base station, and a first binary association variable having any one of a first value and second value preset depending on whether the second mobile base station is associated with the first channel and the second level.

In step S220, when the first parameter value does not match the preset reference value, the processor 13 may calculate a second parameter value from the product of the squared probabilistic path loss between the second mobile base station and the ground user and the transmission power when the second level which is any one of the plurality of power levels is allocated to the second mobile base station and may generate a QUBO model including: a first model parameter calculated from a product of the squared probabilistic path loss between the second mobile base station and the ground user, the transmission power when the second level which is any one of the plurality of power levels is allocated to the second mobile base station, a first association variable having any one of the first value and second value preset depending on whether the second mobile base station is associated with the first channel and the second level, and a second association variable having any one of the first value and second value preset depending on whether the ground user is clustered with respect to the second mobile base station in the clustering step; and a second model parameter calculated by dividing the second parameter value by the first parameter value.

Referring to FIGS. 2 and 4, in step S210, the processor 13 may calculate the first parameter value $\lambda_{den}$ from the product of the squared probabilistic path loss $|g_{m',n}|^2$ between the first mobile base station and the n-th ground user and the transmission power $$P_{m'}^{l'}$$

when the l'-th first level among the plurality of power levels is allocated to the first mobile base station in an assumption that the first channel which is a k-th channel among the plurality of channels is assigned to an m'-th first mobile base station and the second mobile base station which is the m-th mobile base station rather than an m'-th mobile base station, among the plurality of mobile base stations.

In step S220, when the first parameter value matches the preset reference value ($\lambda_{den}$=0), the processor 13 may generate the QUBO model including the first model parameter calculated by adding a negative sign after obtaining the product of the squared probabilistic path loss $|g_{m,n}|^2$ between the second mobile base station and the n-th ground user, the transmission power $$P_m^l$$

when an l-th second level among the plurality of power levels is allocated to the second mobile base station, the first binary association variable $X_{m,k,l}$ having any one of the first value 0 and second value 1 preset depending on whether the second mobile base station is associated with the first channel and the second level or not, and the second binary association variable $s_{m,n}$ having any one of the first value and second value preset depending on whether the n-th ground user is clustered with respect to the second mobile base station in the clustering step of S100.

When the first parameter value does not match the preset reference value, the processor 13 may calculate the second parameter value $\lambda_{num}$ from the product of the squared probabilistic path loss $|g_{m,n}|^2$ between the second mobile base station and the ground user and the transmission power $$P_m^l$$

when the second level which is any one of the plurality of power levels is allocated to the second mobile base station.

In addition, in step S220, the processor 13 may generate the QUBO model including: the first model parameter calculated by adding the negative sign after obtaining the product of the squared probabilistic path loss $|g_{m,n}|^2$ between the second mobile base station and the ground user, the transmission power $$P_m^l$$

when the second level which is any one of the plurality of power levels is allocated to the second mobile base station, the first association variable $X_{m,k,l}$, and the second association variable $s_{m,n}$; and the second model parameter calculated by dividing the second parameter value $\lambda_{num}$ by the first parameter value $\lambda_{den}$.

Thereafter, in step S230, the processor 13 may input the QUBO model $H_{QUBO}$ including the first model parameter into the quantum computer 20 through the communication unit 12, and may allow to output the optimal spin combination $X^*_{m,k,l}$ having the result value between 0 and 1 in order to indicate the association between the m-th mobile base station, the k-th subchannel, and the l-th power level when the QUBO model $H_{QUBO}$ becomes the ground state through the quantum annealing in the quantum computer 20.

In step S240, the processor 13 may obtain the plurality of result values indicating whether the combinations of the mobile base stations, channels, and power levels are optimal or not, the result values being output as the result of annealing the QUBO model including the first model parameters to the ground state in the quantum computer 20.

When the result value of the optimal spin combination for the m-th mobile base station, the k-th subchannel, and the l-th power level is 1, this means that allocating the k-th subchannel and l-th power level to the m-th mobile base station is optimal.

In step S250, the processor 13 may determine the subchannel and power level to be allocated to each mobile base station according to the obtained result value.

In step S250, when the result value of the optimal spin combination for the m-th mobile base station, the k-th subchannel, and the l-th power level is 1, the processor 13 may determine the subchannel to be assigned to the m-th mobile base station as the k-th subchannel, and may determine the power level to be allocated to the m-th mobile base station as the l-th power level.

Hereinafter, an experiment is conducted for confirming that performance is improved compared to that of the conventional technology when communication optimization is performed according to the exemplary embodiments of the present disclosure.

In solving a clustering problem, ground users (GUs) are assigned to aerial base stations (i.e., UAVs) by using each of the quantum annealing (QA) algorithm according to the present disclosure and the existing steepest descent (SD), simulated annealing (SA), and K-means-based algorithms, and subchannels and power levels to be allocated to the aerial base stations (i.e., the UAVs) are determined by using each of the QA algorithm according to the present disclosure and the existing SD and SA-based algorithms.

FIGS. 5A to 5D are graphs illustrating the results of clustering simulation, wherein ground users (GUs) classified into clusters for UAVs different from each other are separated and displayed in colors and shapes, which are different from each other.

In addition, Table 1 shows clustering performance as follows.

TABLE 1

| | SD | SA | K-means | QA |
|---|---|---|---|---|
| Defect matching rate (%) of GU | 29 | 16 | 6 | 0 |
| Normalized value | 1 | 0.624 | 0.065 | 0 |
| Running time(s) | 5.78 | 72.76 | 0.18 | 0.032 |

Figure 5A:
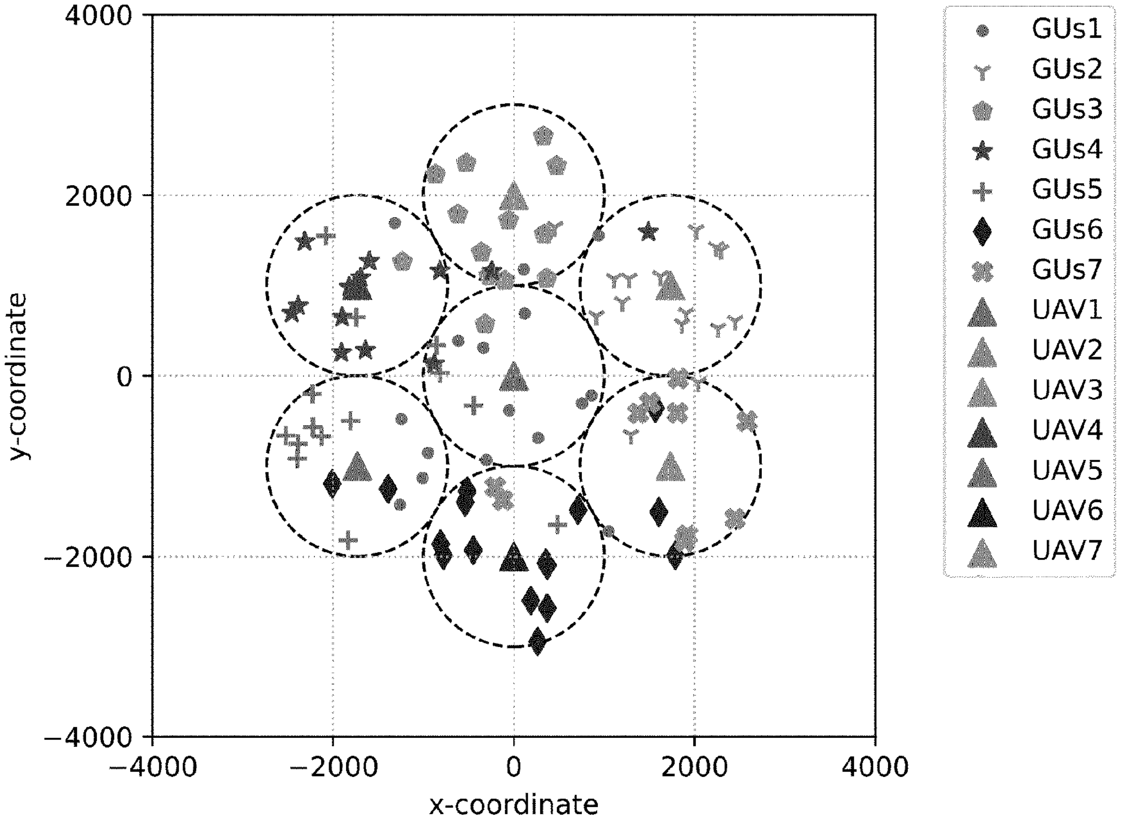
FIG. 5A is a graph illustrating a result of clustering performed by using a conventional SD algorithm.

Referring to Table 1, the SD algorithm has a high defect matching rate of GUs of 29% due to the characteristic of generating locally optimal solutions. In FIG. 5A as well, it may be confirmed that GUs in a coverage area of one UAV are clustered with respect to those of other UAVs, whereby GUs indicated by different symbols are included in the same coverage area.

Figure 5B:
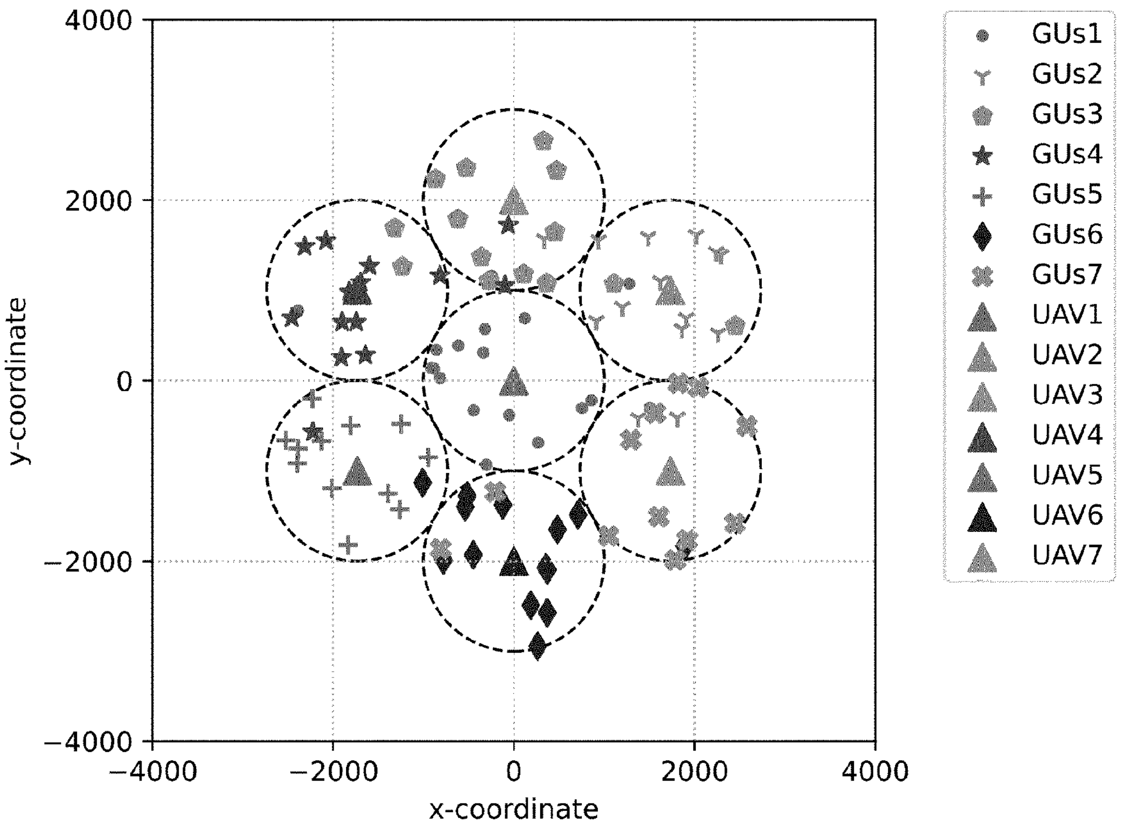
FIG. 5B is a graph illustrating a result of clustering performed by using a conventional SA algorithm.
Figure 5C:
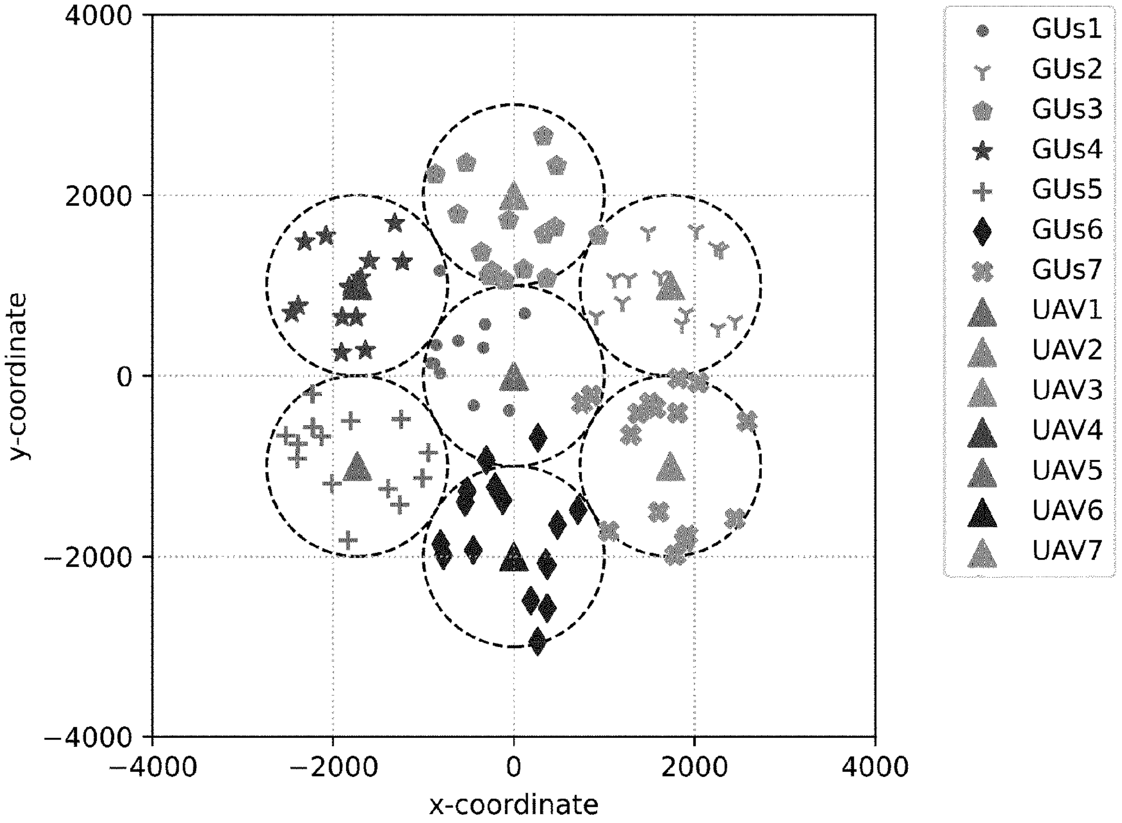
FIG. 5C is a graph illustrating a result of clustering performed by using a conventional K-means algorithm.

In addition, referring to FIG. 5B, the SA algorithm has superior performance compared to the SD algorithm because fewer GUs belonging to the coverage area of one UAV are clustered with respect to other UAVs, but it may be confirmed that a running time is 72.76, which takes a significant time.

It may be confirmed that a running time of the K-means algorithm is 0.18 which is shorter than those of the SD and SA algorithms, and a defect matching rate is also lower than those of the SD and SA algorithms. However, referring to FIG. 5C, it may be confirmed that there is a problem that GUs located at an edge of a coverage area of each UAV are clustered to coverage areas of other UAVs.

Figure 5D:
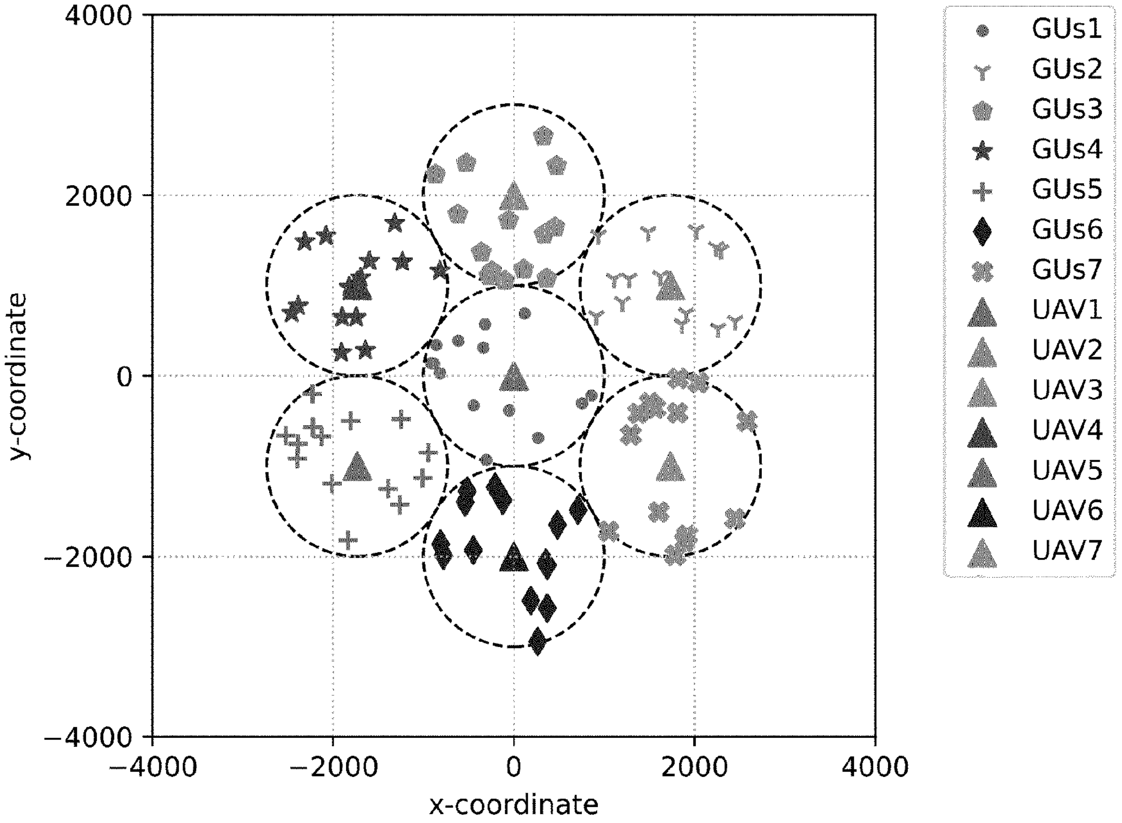
FIG. 5D is a graph illustrating a result of clustering according to the exemplary embodiments of the present disclosure.

In contrast, it may be confirmed that the QA algorithm according to the present disclosure has a shorter running time than those of the SD, SA, and K-means algorithms, and referring to FIG. 5D, the QA algorithm provides an optimal solution throughout the entire area including edges thereof.

That is, according to the present disclosure, there is a merit of enabling optimal clustering at a faster speed compared to existing technologies.

Figure 6A:
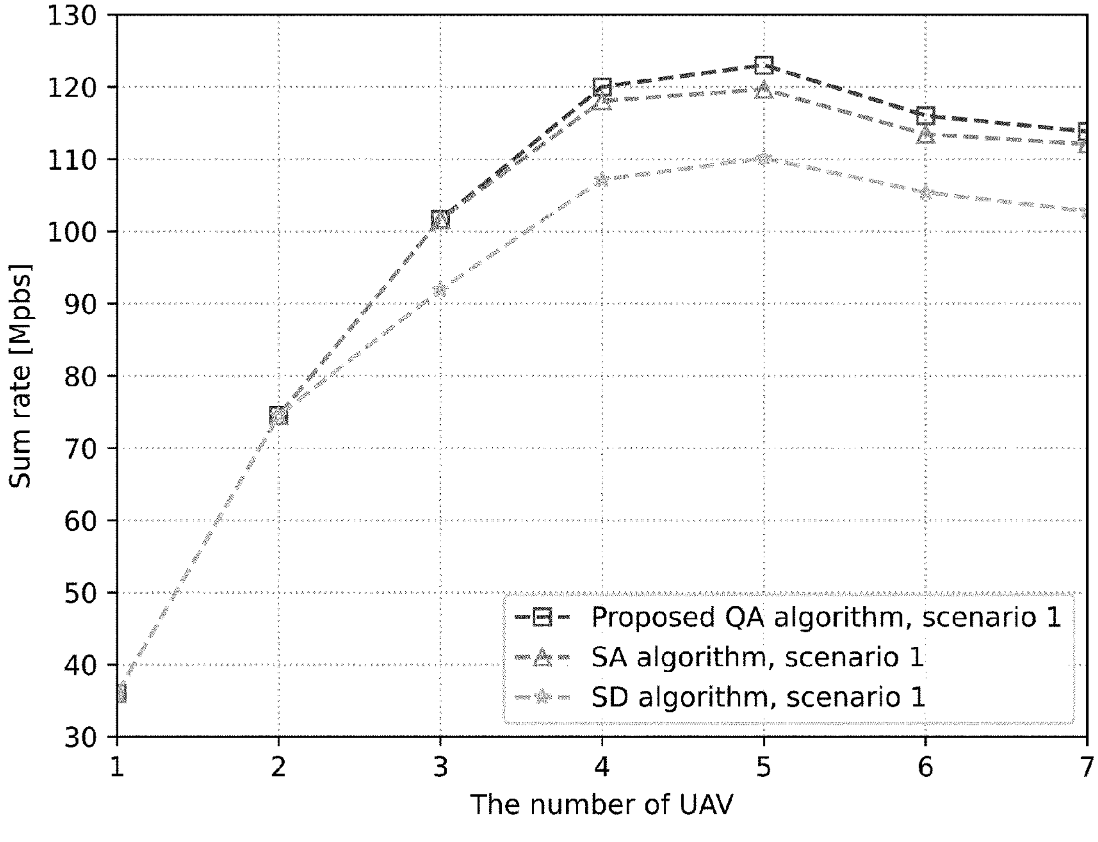
FIG. 6A is a graph illustrating sum rates of transmission derived as a result of optimization, performed in a first scenario simulating a wireless network in which the number of unmanned aerial vehicles used as aerial base stations increases, by using each of the conventional algorithms and the algorithm according to the exemplary embodiments of the present disclosure.
Figure 6B:
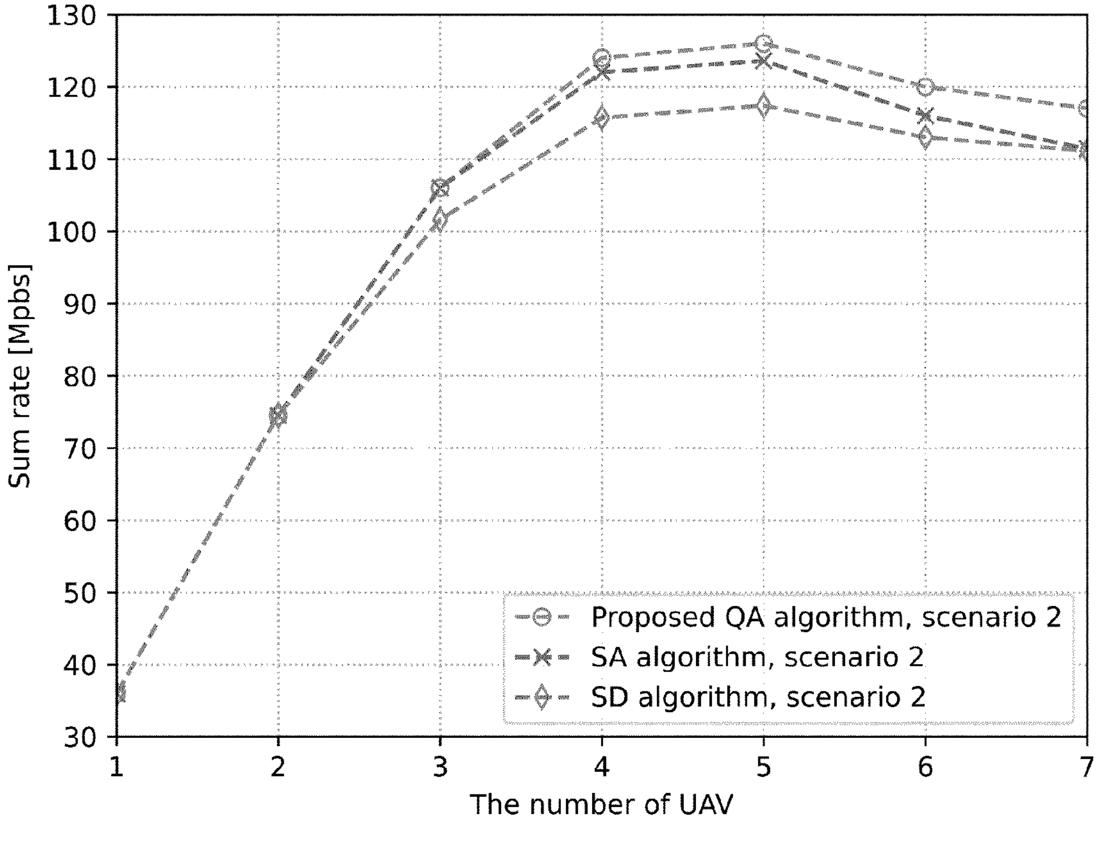
FIG. 6B is a graph illustrating sum rates of transmission derived as a result of optimization, performed in a second scenario simulating a wireless network in which the number of unmanned aerial vehicles used as aerial base stations increases with a larger number of subchannels than that of the first scenario, by using each of the conventional algorithms and the algorithm according to the exemplary embodiments of the present disclosure.

FIGS. 6A and 6B show respective sum rates of transmission, which are derived as results of optimization by using the QA algorithm according to the exemplary embodiments of the present disclosure and the conventional SD and SA algorithms, which are performed in both of a first scenario simulating a wireless network in which the number of unmanned aerial vehicles used as aerial base stations increases and a second scenario simulating a wireless network in which the number of unmanned aerial vehicles increases with a larger number of subchannels than that of the first scenario.

Referring to FIGS. 6A and 6B, it may be confirmed that the sum rates of transmission of the conventional SD and SA algorithms are the same as that of the QA algorithm according to the present disclosure in view of the number of UAVs, but are different from that of the QA algorithm according to the present disclosure as the number of UAVs increases.

That is, according to the present disclosure, it may be confirmed that as the number of UAVs increases in both of the first and second scenarios, the sum rate of transmission of the present disclosure increases compared to those of the conventional SD and SA algorithms, thereby providing better optimization performance.

Figure 7A:
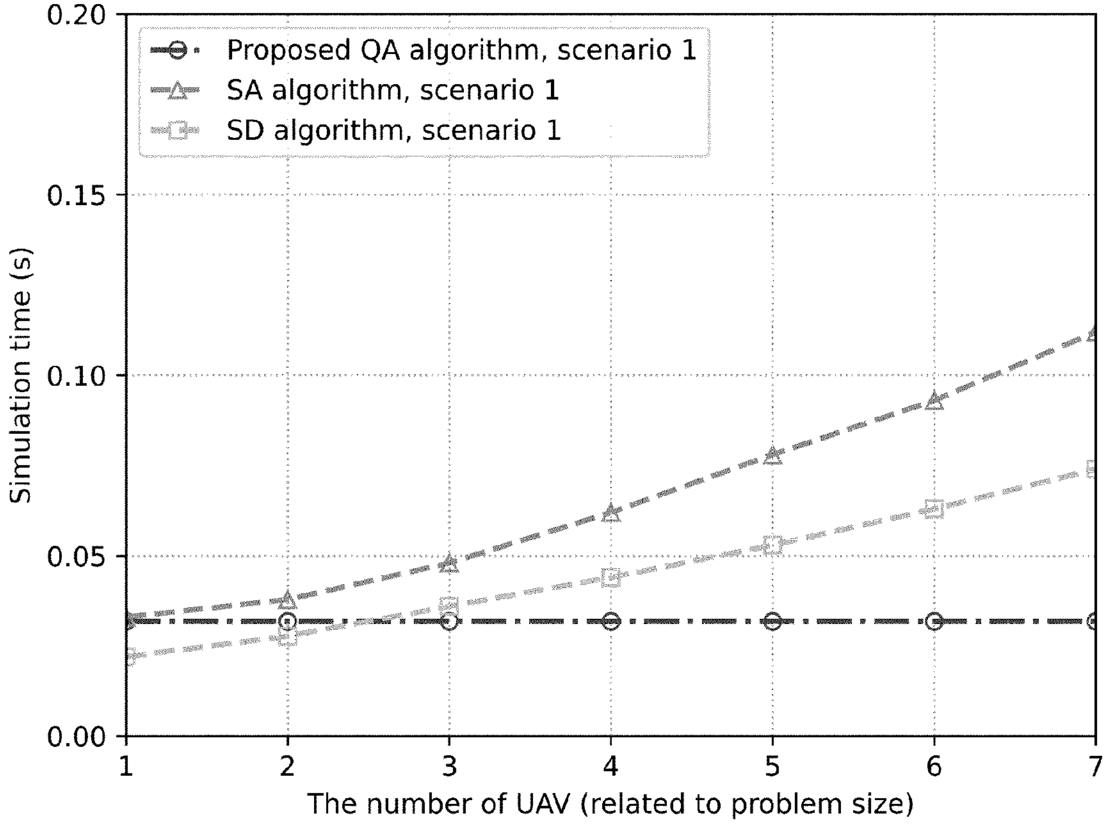
FIG. 7A is a graph illustrating average running times taken to perform the optimization in the first scenario by using each of the conventional algorithms and the algorithm according to the exemplary embodiments of the present disclosure.
Figure 7B:
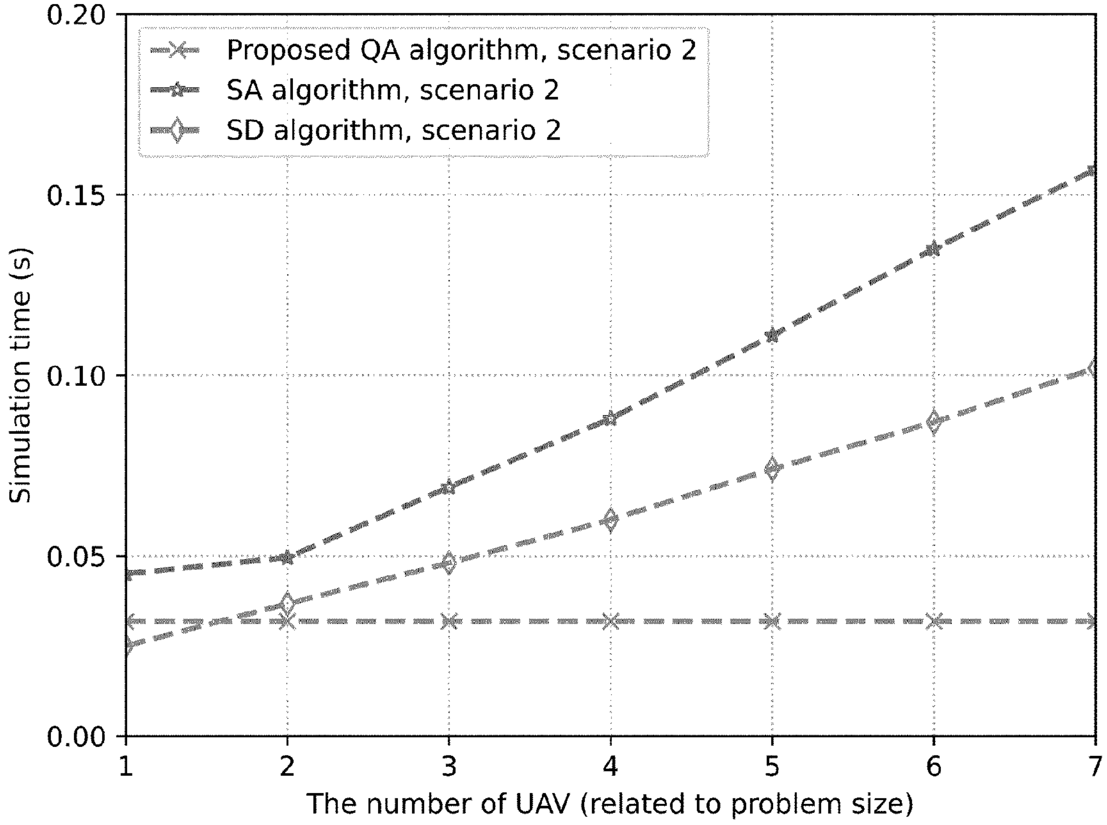
FIG. 7B is a graph illustrating average running times taken to perform the optimization in the second scenario by using each of the conventional algorithms and the algorithm according to the exemplary embodiments of the present disclosure.

In addition, referring to FIGS. 7A and 7B, it may be confirmed that while the running times (i.e., simulation times) of the conventional SD and SA algorithms gradually increase beyond 0.5 as the number of UAVs increases, the QA algorithm according to the present disclosure provides a running time of less than 0.5 even as the number of UAVs increases.

While the conventional optimization technology increases a time required for calculation in proportion to the number of UAVs, the QA algorithm according to the present disclosure enables optimization within a time almost similar to when there is only one UAV even though the number of UAVs increases.

In other words, it may be confirmed that compared to the conventional technology, performance according to the present disclosure is improved in all calculation times, clustering, and throughput.

Accordingly, in communication networks where calculations are complicated due to using a plurality of mobile base stations, or in communication networks where real-time control is important due to using UAVs, the embodiment of the present disclosure performs the clustering and resource allocation of mobile base stations in a short period of time and enables the communication optimization of mobile base stations.

It will be understood that those skilled in the art to which the present disclosure pertains may implement the present disclosure in other specific forms without departing from the technical spirit or essential features thereof. Therefore, it should be understood that the above-described exemplary embodiments are illustrative in all respects and not restrictive. The scope of the present disclosure is indicated by the following claims rather than the above detailed description, and all changes or modifications derived from the meaning and scope of the claims and equivalent concepts should be interpreted as being included in the claims of the present disclosure.

What is claimed is:

1. A method for optimizing communication of mobile base stations, the method being performed by an electronic apparatus including a memory and a processor, the method comprising:

calculating a first parameter value from a product of squared probabilistic path loss between a first mobile base station and a ground user and transmission power when a first level which is any one of a plurality of power levels is allocated to the first mobile base station, assuming that a first channel which is any one of a plurality of channels is assigned to the first mobile base station which is any one of the plurality of mobile base stations and a second mobile base station which is another mobile base station;

generating a Quadratic Unconstrained Binary Optimization (QUBO) model comprising a first model parameter calculated from a product of squared probabilistic path loss between the second mobile base station and the ground user, transmission power when a second level which is any one of the plurality of power levels is allocated to the second mobile base station, and a first association variable having any one of a first value and second value preset depending on whether the second mobile base station is associated with the first channel and the second level when the first parameter value matches a preset reference value depending on whether the first parameter value matches the preset reference value or not;

inputting the QUBO model comprising the first model parameter into a quantum computer;

obtaining a plurality of result values indicating whether each combination of the mobile base stations, channels, and power levels, which is output as a result of annealing the QUBO model comprising the first model parameter to a ground state in the quantum computer, is optimal or not;

selecting at least one of the combinations of the mobile base stations, the channels, and the power levels, output as the result of annealing the QUBO model, indicated as being optimal; and configuring the mobile base stations, the channels, and the power levels in the selected combination to enable communication between the mobile base stations and the ground user based on the selection.

2. The method of claim 1, further comprising:

clustering, before calculating the first parameter value, the ground user with respect to any one mobile base station according to each distance between the ground user and the plurality of mobile base stations, wherein, when the first parameter value matches the preset reference value, the generating of the QUBO model comprising the first model parameter further comprises:

the first model parameter calculated from the product of the squared probabilistic path loss between the second mobile base station and the ground user;

the transmission power when the second level which is any one of the plurality of power levels is allocated to the second mobile base station, the first association variable having any one of the first value and second value preset depending on whether the second mobile base station is associated with the first channel and the second level; and a second association variable having any one of the first value and second value preset depending on whether the ground user is clustered with respect to the second mobile base station in the clustering step.

3. The method of claim 1, further comprising:

clustering, before calculating the first parameter value, the ground user with respect to any one mobile base station according to each distance between the ground user and the plurality of mobile base stations, wherein, when the first parameter value does not match the preset reference value, the generating of the QUBO model comprising the first model parameter further comprises:

calculating a second parameter value from a product of the squared probabilistic path loss between the second mobile base station and the ground user and the transmission power when the second level which is any one of the plurality of power levels is allocated to the second mobile base station and generates the QUBO model comprising the first model parameter calculated from the product of the squared probabilistic path loss between the second mobile base station and the ground user, the transmission power when the second level which is any one of the plurality of power levels is allocated to the second mobile base station, the first association variable having any one of the first value and second value preset depending on whether the second mobile base station is associated with the first channel and the second level, and the second association variable having any one of the first value and second value preset depending on whether the ground user is clustered with respect to the second mobile base station in the clustering step; and calculating a second model parameter by dividing the second parameter value by the first parameter value.

4. The method of claim 2, wherein the clustering step comprises:

generating the QUBO model comprising a model parameter calculated by a product of distances calculated by differences between a location coordinate of the ground user and location coordinates of the mobile base stations and an association variable having a first value or second value preset depending on whether the ground user and the mobile base stations are associated with each other;

inputting the QUBO model comprising the model parameter to the quantum computer;

obtaining the plurality of result values indicating whether each combination of the mobile base stations and the ground user, which is output as a result of annealing the QUBO model comprising the model parameter to a ground state in the quantum computer, is optimal or not; and classifying the ground user with respect to any one mobile base station, among the plurality of mobile base stations, having a result value obtained from a combination with the ground user is a value corresponding to an optimum value.

5. The method of claim 3, wherein the clustering step comprises:

generating the QUBO model comprising a model parameter calculated by a product of distances calculated by differences between a location coordinate of the ground user and location coordinates of the mobile base stations and an association variable having a first value or second value preset depending on whether the ground user and the mobile base stations are associated with each other;

inputting the QUBO model comprising the model parameter to the quantum computer;

obtaining the plurality of result values indicating whether each combination of the mobile base stations and the ground user, which is output as a result of annealing the QUBO model comprising the model parameter to a ground state in the quantum computer, is optimal or not; and classifying the ground user with respect to any one mobile base station, among the plurality of mobile base stations, having a result value obtained from a combination with the ground user is a value corresponding to an optimum value.

6. An apparatus for optimizing communication of mobile base stations, the apparatus comprising:

a memory for storing at least one or more instructions;

a communicator for performing communication with a quantum computer; and a processor connected to the memory and the communicator, the processor configured to perform the at least one or more instructions, so as to generate a Quadratic Unconstrained Binary Optimization (QUBO) model to be input into the quantum computer, wherein, as performing the at least one or more instructions, the processor is further configured to:

calculate a first parameter value from a product of squared probabilistic path loss between a first mobile base station and a ground user and transmission power when a first level which is any one of a plurality of power levels is allocated to the first mobile base station in an assumption that a first channel which is any one of a plurality of channels is assigned to the first mobile base station which is any one of the plurality of mobile base stations and a second mobile base station which is another mobile base station;

generate the QUBO model comprising a first model parameter calculated from a product of squared probabilistic path loss between the second mobile base station and the ground user, transmission power when a second level which is any one of the plurality of power levels is allocated to the second mobile base station, and a first association variable having any one of a first value and second value preset depending on whether the second mobile base station is associated with the first channel and the second level when the first parameter value matches a preset reference value depending on whether the first parameter value matches the preset reference value or not;

input the QUBO model comprising the first model parameter into the quantum computer through the communication unit;

obtain a plurality of result values indicating whether each combination of the mobile base stations, channels, and power levels, which is output as a result of annealing the QUBO model comprising the first model parameter to a ground state in the quantum computer, is optimal or not;

select at least one of the combinations of the mobile base stations, the channels, and the power levels, output as the result of annealing the QUBO model, indicated as being optimal; and facilitate communication between the mobile base stations and the ground user based on the selection.

7. The apparatus of claim 6, wherein the processor is further configured to:

before calculating the first parameter value, cluster the ground user with respect to any one mobile base station according to each distance between the ground user and the plurality of mobile base stations; and when the first parameter value matches the preset reference value after calculating the first parameter value, generate the QUBO model comprising:

the first model parameter calculated from the product of the squared probabilistic path loss between the second mobile base station and the ground user, the transmission power when the second level which is any one of the plurality of power levels is allocated to the second mobile base station;

the first association variable having any one of the first value and second value preset depending on whether the second mobile base station is associated with the first channel and the second level; and a second association variable having any one of the first value and second value preset depending on whether the ground user is clustered with respect to the second mobile base station in the clustering.

8. The apparatus of claim 6, wherein the processor is further configured to:

before calculating the first parameter value, cluster the ground user with respect to any one mobile base station according to each distance between the ground user and the plurality of mobile base stations; and when the first parameter value does not match the preset reference value after calculating the first parameter value, calculate a second parameter value from the product of the squared probabilistic path loss between the second mobile base station and the ground user and the transmission power when the second level which is any one of the plurality of power levels is allocated to the second mobile base station and generate the QUBO model comprising the first model parameter calculated from the product of the squared probabilistic path loss between the second mobile base station and the ground user, the transmission power when the second level which is any one of the plurality of power levels is allocated to the second mobile base station, the first association variable having any one of the first value and second value preset depending on whether the second mobile base station is associated with the first channel and the second level, and the second association variable having any one of the first value and second value preset depending on whether the ground user is clustered with respect to the second mobile base station in the clustering; and calculate a second model parameter by dividing the second parameter value by the first parameter value.

9. The apparatus of claim 7, wherein the processor is further configured to:

based on the clustering, generate the QUBO model comprising a model parameter calculated by a product of distances calculated by differences between a location coordinate of the ground user and location coordinates of the mobile base stations and an association variable having a first value or second value preset depending on whether the ground user and the mobile base stations are associated with each other;

input the QUBO model comprising the model parameter to the quantum computer;

obtain a plurality of result values indicating whether each combination of the mobile base stations and the ground user, which is output as a result of annealing the QUBO model comprising the model parameter to a ground state in the quantum computer, is optimal or not; and classify the ground user with respect to any one mobile base station, among the plurality of mobile base stations, having a result value obtained from a combination with the ground user being a value corresponding to an optimum value.

10. The apparatus of claim 8, wherein the processor is further configured to:

based on the clustering, generate the QUBO model comprising a model parameter calculated by a product of distances calculated by differences between a location coordinate of the ground user and location coordinates of the mobile base stations and an association variable having a first value or second value preset depending on whether the ground user and the mobile base stations are associated with each other;

input the QUBO model comprising the model parameter to the quantum computer;

obtain a plurality of result values indicating whether each combination of the mobile base stations and the ground user, which is output as a result of annealing the QUBO model comprising the model parameter to a ground state in the quantum computer, is optimal or not; and classify the ground user with respect to any one mobile base station, among the plurality of mobile base stations, having a result value obtained from a combination with the ground user being a value corresponding to an optimum value.

* * * * *